Patented Nov. 27, 1951

2,576,565

UNITED STATES PATENT OFFICE 2,576,565

CERAMIC PRODUCT AND METHOD OF MAKING THE SAME

Charles Raymond Brown, Llanerch, Pa., assignor to G. and W. H. Corson, Inc., Plymouth Meeting, Pa., a corporation of Delaware No Drawing. Application April 4, 1947, Serial No. 739,357

12 Claims. (Cl. 106—39)

The present invention relates to a ceramic product and to the body from which it may be produced and, more particularly, it relates to a ceramic product comprising the waste ash material obtained from coal-burning industrial power and other plants, and to the method of producing the same. The product of the present invention, as will hereinafter appear, possesses properties at least equivalent to those of conventional clay or shale ceramic products and, therefore, may be used as a substitute therefor; for example, the product of the present invention may be in the form of a brick, a tile, or a pipe.

FIELD TO WHICH INVENTION RELATES

In the preparation of ceramic products, it is customary to use as a raw material source, various forms of clay, shale, and the like. These products are to be found in nature in various deposits and are always associated with considerable quantities of water, both in the free and combined state. These materials when properly processed can be formed into desired shapes, and the intermediate product thus produced is placed in kilns where the material is subjected to various stages of drying, smoking, firing, and vitrification to produce a hard, dense, homogeneous structure, largely continuous or isotropic in character. There are several methods in use for the preparation of the formed intermediate product, for example, the dry press method and extrusion method. The extrusion method has the advantage of increased speed of production and, in this method, the clay or shale after being processed to form a plastic composition is extruded in a continuous ribbon, cut to shape, placed upon drying cars, and placed in a kiln where it is subjected to the various treatments referred to above.

OBJECTS OF INVENTION

One object of the present invention is to provide a ceramic product of advantageous properties, making it especially suitable for use as a structural material.

Another object is to provide a ceramic product which, because of its properties, is available for use for the various purposes where conventional clay or shale ceramic products are now used, including the use of the product in the form of a brick, a tile, a sewer pipe, and the like.

A further object of the present invention is to provide a ceramic product by the utilization of waste material produced by the burning of coal in power and industrial plants.

Still another object of the invention is to produce a ceramic body from a new source of material, utilizing manufacturing methods similar to those employed for the conventional type of ceramic material, but which body, during its production into the ceramic product, is characterized by low shrinkage during the drying and firing cycles, by reduced firing time, and by an increased available vitrification range.

Still another object of the present invention is to provide a fired or vitrified ceramic body which, although not produced from the usual materials, possesses the red color characteristic of conventional brick and similar products.

Other objects, including the provision of a method by which the novel products of the invention may be produced, will be apparent from a consideration of this specification and the claims.

SOURCE OF FLY ASH AND COAL ASH SLAG

Power plants and the like which consume large quantities of coal, especially powdered coal, produce correspondingly large quantities of two types of waste material, namely, coal ash dust, commonly called fly ash, and slag. The fly ash is the finely divided ash material which is carried from the furnace by stack gases and is collected as it leaves the furnace in electrostatic precipitators, or other type of collectors. The portion of the ash that does not leave the furnace with the stack gases as floating ash is cooled in the molten state, for example, by being dropped into water underneath the furnace, and this portion of the ash is commonly called slag and will be referred to hereinafter as "coal-ash slag" or merely as "slag."

PRIOR USES OF FLY ASH AND OF COAL ASH SLAG

The problem involved in disposal of the fly ash and slag is very great because the tonnage produced in some of the utility companies is very high. Numerous attempts have been made to utilize this material, most of the efforts being directed toward the preparation of concrete compositions in which the fly ash has been used as an admixture and as a replacement for Portland cement. Some attempts have also been made to utilize fly ash in conjunction with ceramic compositions, but, in all of these applications, the fly ash has been blended with other compounds that are normally employed for producing ceramic bodies; for example, the addition of fly ash to plastic clay bodies, blends with carbonaceous materials and with special types of ores have been proposed. These attempts have not met with commercial success, the chief difficulty being that it has been necessary to associate large quantities of the secondary products with the fly ash so that the fly ash merely acts as a diluent for the plastic clay. So far as is known, the use of slag has not been utilized for the production of ceramic products.

GENERAL STATEMENT OF PRODUCT OF INVENTION

In accordance with the present invention, the fly ash is present in the ceramic product as the continuous glasseous phase or matrix, and coal-ash slag comprises the refractory particles or grog. By the invention, a vitrified ceramic product is provided in which refractory particles are bound in a continuous matrix consisting primarily of thermally merged fly ash, that is to say the glasseous phase or matrix in the vitrified product comprises at least about 80% fly ash, and preferably at least about 90% fly ash. In the preferred embodiment, as will hereinafter be discussed, the glasseous bond or matrix will be substantially fly ash since in this embodiment the linear shrinkage of the product during firing will be negligible. However, additives of the type used in ceramic compositions, such as clay, shales, fluxes, dry-strength-increasing binders, and anti-scumming agents, are compatible with the fly ash in the same manner that they are compatible with other bonding materials used in the production of ceramic products and, therefore, the product may, if desired, contain relatively small amounts of such materials. These materials may react with the fly ash to produce a modified fly ash bond with or without altering the resulting physical properties, such as, for example, the linear shrinkage factor of the product during firing. If such a material is present in the body from which the ceramic product is produced, it will be present to a limited extent, namely, in such a controlled amount that the glasseous phase or matrix will comprise not less than about 80% and preferably not less than about 90% of fly ash. The coal-ash slag present as the refractory particles, or grog, may be attacked at the surface of the particles by the fly ash to produce an interfacial bond between the particles and the glasseous fly ash matrix. In the preferred embodiment of the invention, the moldable body consists essentially of fly ash, coal-ash slag, and water, to which may be added a small amount of a dry-strength-increasing material.

In the above description, reference has been made to the fact that the fly ash is present in the ceramic product as the continuous or glasseous phase, and it has also been pointed out that the fly ash contains refractory particles. These particles are not part of the continuous glasseous phase, but since they are present in relatively small amounts in the fly ash, the figures of 80% and 90% used herein with respect to the fly ash content of the bond refer, for convenience, to the fly ash as a whole.

UTILITY OF PRODUCT OF THE INVENTION

The product of the present invention can replace the standard clay or shale ceramic bodies in the various fields where such products are now used. For example, the color, density, porosity, durability, texture, compressive strength, and modulus of rupture of the product of the invention will, in general, be in the range of the corresponding properties of the clay or shale type ceramic products. The product of the invention may, therefore, be considered as a substitute or imitation clay or shale ceramic product. The ceramic body of the invention, however, is produced from materials which are entirely foreign to the normal type of products that are employed in conventional methods. The fly ash, for example, has no binding power which is a characteristic of clays and shales, and the fly ash is not considered plastic as the term "plasticity" is applied to clays and shales. It could, therefore, not be predicted that a body comprising primarily fly ash, slag, and water could be prepared which would possess sufficient moldability or "plasticity" to be formed into self-supporting ceramic shapes by the conventional ceramic-making equipment.

GENERAL STATEMENT OF PROCESS OF THE INVENTION

In accordance with the process of the present invention, a moldable mass is prepared by mixing the fly ash-containing composition with water, for example, by a pugging operation; the moldable mass is then formed into the desired shape; and the shaped product is dried and oxidized and vitrified. During the oxidation, any carbon in the fly ash is burned out and the iron in the fly ash is converted to the ferric state. It is an important feature of the invention that the fly ash body can be formed in the conventional type of machinery into ceramic shapes of sufficient green-strength to be handled in the drier and of sufficient dry-strength to be handled satisfactorily in a kiln. For example, a body may be prepared which can be formed in a dry press, or may be extruded in a conventional brick-forming machine or may be molded in any other conventional manner, for instance, by ramming, by jogging, or by hot pressing. In the case of extrusion, the extruded structure can be cut into industrial bricks by the usual wire-cutting means.

SHRINKAGE CONTROL OF PRODUCT OF THE INVENTION

Referring to the preferred embodiment, it is an important feature thereof that the shaped products do not shrink appreciably during the firing, and this substantial lack of shrinkage is to be contrasted to the relatively large amount of shrinkage obtained when clay or shale products are vitrified. During the firing of such products, the linear shrinkage will generally be between 10% and 15% and may reach 20% or 25%. If the body of the invention does not contain material causing shrinkage of the product during firing, the product will be characterized by a very low linear shrinkage factor; for example, the linear shrinkage factor will generally be only a few tenths of a per cent. and will not usually be greater than 1%. Advantageously, even when a material which causes shrinkage is present in the body, the amount is controlled so that the product during firing will not have a linear shrinkage factor greater than about 5% and preferably not greater than about 2%. These figures are based on a ceramic product that has been subjected to firing conditions that will hereinafter be discussed, as distinguished from a product that has been overfired. However, when shrinkage is not undesirable, materials causing shrinkage may be present in such amounts that substantial shrinkage occurs, although as stated, the amount of such material is controlled so that the thermally produced bond is made up of at least about 80% and preferably at least about 90% fly ash.

DISTINCTIONS BETWEEN PRESENT PROCESS AND PRIOR CERAMIC PROCESSES

The processing of the fly ash body, while in general conforming to the same mechanical steps employed in the formation of the usual type ceramic product, does not involve the same physical and chemical changes. Thus, there is no need for stages, during the firing cycle, where a dehydration or a smoking period must be employed. As will hereinafter be shown, the material need merely be subjected to a preliminary drying step, an oxidation period, and a vitrification period.

CARBON CONTENT OF FLY ASH

The fly ash and coal-ash slag used in the production of the products of the invention may be obtained from industrial furnaces burning bituminous or anthracite coal, particularly powdered coal. In view of the fact, however, that the majority of the power and industrial plants burn bituminous coal and the fly ash and slag therefrom is, therefore, available in greater quantities, the invention will be described with particular reference to the fly ash and slag of bituminous coal. The composition of the fly ash and of the slag obtained from the same coal is generally very close except as to carbon content, since the fly ash normally contains from a few tenths of a per cent., generally from 1%–2% to 20%–25% of carbon, whereas the slag is carbon-free. In some insolated instances, the carbon content of the fly ash may be as high as 50% or even 70%. The carbon content of the fly ash represents the amount of the original coal that did not burn during the combustion of the main body of the coal. While in the operation of the furnace, the fuel passes through a combustion zone where it ignites and reaches temperatures in excess of 3000° F., carbon to some extent at least is found in the fly ash due to the very short time of exposure and to the inefficiency of the combustion.

REMOVAL OF CARBON DURING PREPARATION OF PRODUCT

The ceramic product of the invention is carbon-free and when the fly ash contains the normal amount of carbon, for example up to 20% to 25%, the carbon may be readily removed during the firing cycle. It is desirable to burn out substantially all of the carbon prior to vitrification of the product, and for this reason, the kiln may be kept at a temperature below the vitrification temperature, but generally in excess of 1000° F., until the carbon is substantially removed. When a fly ash with a relatively low carbon content is used, the product fires more rapidly, contains fewer voids, and is stronger and denser than one produced from a fly ash containing a relatively high carbon content. In the preparation of a ceramic product from a mix consisting of a high proportion of fly ash, the fly ash used should contain a relatively low carbon content, for example below about 12%, and the lower the carbon content, the better so that in this case the use of a substantially carbon-free fly ash is often advantageous. The higher the proportion of slag, the higher can be the percentage of carbon in the fly ash.

When the carbon content of the fly ash is above the normal range, and if desired, even when the fly ash contains the normal amount of carbon, the carbon content of the fly ash may be reduced or substantially completely removed in a separate step prior to the formation of the molded product. Thus, the fly ash may be calcined at a temperature above about 1000° F. to cause burning of the carbon. Other methods may be employed, for example, flotation, air-classification, screening, and the use of an electrical contact potential separator. If the carbon of the fly ash is eliminated in a preliminary step, a shorter firing cycle may be employed in the production of the ceramic product so that a simpler kiln of less costly design may be employed. In addition, the product will be stronger and denser. However, unless the carbon content is relatively high, it will generally be more convenient, in order to avoid additional handling, to burn out the carbon in the kiln.

FUSION CHARACTERISTICS OF FLY ASH AND COAL ASH SLAG

The mineral content of the fly ash and slag conform closely to the analysis of the ash found in coal residues. Large variations in the silica, alumina, and iron content have very little effect on the product and, therefore, the composition of the fly ash (except as to the carbon content) and of the slag does not play any significant role in the manufacture of the product. This means that fly ash and coal-ash slag from any available source may be used in the production of the product of the invention. The fusion temperature of the fly ash and slag is close and in general runs between about 2200° F. and about 2600° F., the fusion temperature of the slag usually being 20° to 50° lower than that of the fly ash. As stated previously, due to the method of formation of the fly ash and slag, no combined water is present. Furthermore, the materials are highly inert at room temperature and show no tendency to react chemically either with themselves or with water, or with water solution of simple chemicals.

PARTICLE SIZE OF FLY ASH

The particle sizes of the fly ash and of the slag will be such that, when the particles are mixed with water, a body will result which can be molded to the desired shape in the conventional equipment used to form ceramic shapes, for example, the dry press or the extrusion machine. The particle sizes may, therefore, vary widely, and it is to be understood that if the particles are friable, they may be reduced in size in the pugging or other preliminary step. The fly ash is relied upon to impart the required moldability to the mix and the reason the fly ash can thus function is because of the fact that, although the particles are extremely small, they exist in the size, shape, and classification necessary to form a body possessing the required moldability or "plasticity" to be shaped. The finer particles of the fly ash, therefore, can be dispersed throughout the larger particles to form a moldable mix which can be formed into a very dense and solidified product.

The fly ash may, in most instances, be used directly without treatment to reduce the particle size. In general, the fly ash in the mix after preliminary pugging or the like will comprise particles, about 90% of which pass a 325-mesh screen and the majority of which are sub-micron in size. If the fly ash contains an appreciable quantity of particles in excess of 10% which remain on a 325-mesh screen and these are not sufficiently friable to be reduced in size by the pugging or like operation, the fly ash may be subjected to a preliminary operation, for example, by grinding in a ball mill or by calcining to remove the carbon. This latter procedure reduces the particle size considerably, usually to the range required for proper moldability. Furthermore, certain types of fly ash contain a relatively large amount of coke-like particles which may interfere with the formation of a satisfactory moldable mass, as compared to the usual type of fly ash product, which contains only a relatively small amount of the carbon in the form of coke-like particles. It is often advisable to subject the fly ash containing relatively large amounts of coke-like particles to a treatment to destroy or reduce the number of such particles prior to the formation of the mix which is to be shaped. This can be accomplished by calcining the fly ash, by ball-milling it, or by employing a longer pugging time than that required for fly ashes that contain the carbon in non-coke-like form. For example, an additional five or ten minutes of pugging time will alter the characteristics of the coke particles through self-attrition and the mass will then develop the desired moldability.

FUNCTION OF COAL ASH SLAG

While the fly ash is permanently black at normal temperatures and the particles of coal-ash slag resemble black glass, the products of the present invention possess a reddish coloration characteristic of conventional brick products and the more slag present, the redder will be the fired ceramic product. When a ceramic product is made of fly ash and only a small amount of slag, the final product will be a yellowish red and the red coloration increases as the proportion of slag is increased, for example, a product made from a mixture of 25% fly ash and 75% slag will be a dark red with a purplish cast. In addition to the increase in red color imparted to the final product by the slag, the use of slag in the mix improves the product since it gives a better structure, increases the density, and serves to stabilize the product. It also affords means of obtaining products of different specific gravities and permits the use of a fly ash with a higher carbon content. The presence of the slag also introduces a secondary effect which is the result of the fact that its iron content remains in the reduced state in which it can act as a flux. Since the slag granules are larger in size than the fly ash particles, the iron remains largely unchanged during the oxidation period of the firing cycle which oxidizes the iron of the fly ash. The iron in the reduced state in the slag particles, therefore, causes the slag particles to swell, flux, and soften on the surface as the temperature is increased. This tendency for the slag particles to soften enables the fly ash to combine at the interface more readily and increased strength and decreased porosity is developed in the fired product.

PROPORTIONS OF COOL ASH SLAG

For the foregoing reasons, the use of slag with the fly ash is highly advantageous and the amount may range from a few per cent, for example 5%–10% up to about 80%, based on the weight of the mixture of fly ash and slag. In most instances, the amount of slag on this basis will be between about 35% and about 65%, especially satisfactory results being obtained when the amount of fly ash and slag are almost equal, for instance when the slag is from 45% to 55% of the mixture of fly ash and slag. When the amount of slag is present in the preferred range of between about 35% and about 65%, the carbon content of the fly ash can be in the upper portion of the normal range, for example, from 10% to 25%.

PARTICLE SIZE OF COAL ASH SLAG

The slag obtained from the furnaces varies in size, depending on conditions present at the time it is removed from the furnace, and ranges from a semi-fibrous form to a granular composition in which the individual particles resemble particles of black glass. The slag is very abrasive and shows a tendency to fracture readily. The slag as obtained from the furnace is usually subjected to a grinding action, such as is obtained in an impact mill or other equipment designed to produce granules rather than fines. It is preferred to use particles smaller than those that will pass a 10-mesh screen. In the preferred embodiment, the slag is crushed so that the majority of particles will pass through a 10-mesh screen and will be caught on a 30-mesh screen. Particles which pass a 60-mesh screen will decrease the moldability of the mix and should be kept at a minimum, since the finer particles of slag approach in size the larger particles of the fly ash and begin to adversely affect the moldability of the fly ash. In a typical case, a satisfactory screen analysis was as follows:

Through 10-mesh and on 20-mesh, 20%;
Through 20-mesh and on 30-mesh, 39%;
Through 30-mesh and on 40-mesh, 12%;
Through 40-mesh and on 50-mesh, 9%;
Through 60-mesh and on 80-mesh, 4%;
Through 80-mesh and on 100-mesh, 5%;
Through 100-mesh and on 200-mesh, 4%; and
Through 200-mesh, 7%.

In order to obtain optimum results, although many times these are not required, a slag having particle sizes so that 90% will pass a 10-mesh screen and 90% will be retained on a 60-mesh screen will be used.

PREPARATION OF MOLDABLE MIX

The moldable mix is prepared by mixing water with the fly ash slag mixture. If desired, a material serving to increase the dry strength of the shaped mass may also be added as hereinbefore mentioned, and this material may also function to some extent at least to increase the moldability of the body. The amount of water used will depend on the particle size and surface area of the fly ash, the amount of slag present, the type and amount of dry-strength-increasing material if any, and the type of manufacturing process that is employed. In any case, the amount of water which is used to form the moldable mix will be sufficient to permit the resulting mix to be shaped in the equipment used, for example, the dry press or the extrusion machine. In most instances, the water content will be between about 10% and about 20% to 25%, depending on the above-recited conditions. When a dry press is used, the water content may be substantially lower than when an extrusion machine is employed, for example, 6% to 8%. In the use of extrusion machines, for example, the conventional De-Airing machine, the water content of the mass may be as low as about 12% on the dry basis.

As stated, a material to increase the dry strength of the shaped product prior to firing may be used and its use is recommended unless a procedure is followed where there is little if any handling of the shaped products, for example, where the material is formed in a dry press. Even in this instance, the use of a small percentage of a material increasing the dry-strength is recommended as is also the case where the moldable mix is to be extruded. This material is not to be confused with a material which is added to provide the bond in the fired product. The material increasing the dry-strength may be organic or inorganic in nature. In the former case, it is burned out in the firing cycle and in the latter case, while it will be present in the final product, it will be present in such a minor amount that its effect will be negligible as compared to the bond provided by the vitrified fly ash.

The dry-strength-increasing material employed may be selected from a wide variety of materials. Examples of organic materials are natural gums, dextrin, guloc, which comprises an alkali or alkaline earth metal salt of ligno sulphonic acid, and talloil, and examples of inorganic materials are sodium silicate, bentonite, and highly adhesive clays. The amount usually employed will be very small, for example, 1% to 2% or less of the weight of the fly ash and slag. When inorganic dry-strength-increasing material is employed in amounts less than about 2% of the fly ash and slag, the matrix will consist substantially entirely of thermally merged fly ash even though there is a reaction between the fly ash and the dry-strength-increasing material in the matrix. Larger amounts up to 20% based on the combined weight of the fly ash, slag, and added material, for example, may be employed if desired. The amount of dry-strength-increasing material present is advantageously kept at as low a value as practicable. In the case of organic materials which are burned out in the firing, the absorption value of the final product will increase as the amount of material is increased. In the case an inorganic dry strength-increasing material is used, the tendency of the product to shrink increases as the amount of material is increased. When an inorganic dry-strength-increasing material is used, the amount employed will preferably be below that causing a linear shrinkage in the product during firing of more than about 5%, and preferably the amount employed will not cause a linear shrinkage of more than about 2%.

Of the dry-strength-increasing materials that may be used, bentonite is preferred and it is advantageous to add the bentonite in the form of a plastic slip prepared by adding the dry bentonite to water, for example, a 10% bentonite slip (10% bentonite, 90% water by weight). When such a slip is added, it may be relied upon to furnish all or a portion of the required water. The bentonite, in addition to providing the desired dry-strength, functions as a lubricant in the mixer and hence serves as an aid in obtaining the desired moldability with less pugging time. The amount of bentonite may be present in the moldable mix from 0.1%–0.2% up to about 20% or more based on the combined weight of the fly ash and the bentonite, but is usually used in an amount between about 1% and about 2%.

The preparation of the wet body or moldable mix requires simple blending equipment and can be done in a dry pan or by simply feeding the ingredients together through a conveyor system into a pugging mill.

SHAPING, DRYING AND FIRING
OF THE PRODUCT

After the moldable mix is formed, it is shaped by any suitable equipment, for example, a dry press or an extrusion machine. The use of the modern vacuum type processes is ideally suited to the preparation and molding of these products. The drying of the shaped masses may be accomplished in any manner, for example, by placing the wet forms on racks or cars and passing these through a tunnel drier in which waste heat gases are employed to evaporate the water. One of the unique characteristics of the preferred composition is the absence of appreciable shrinkage during the drying cycle. This results in numerous manufacturing advantages since the product can be dried very rapidly and the resulting dried material is substantially free from distortion, cracks, and breakage. Furthermore, large sized pieces or unusual shapes may be formed readily with no danger of dimensional change or breakage during drying.

The necessary changes that must take place during the firing cycle are, first, the elimination of any residual carbon present in the product; secondly, the conversion of the black color to the reddish, or reddish-brown coloration of the finished product by oxidation; and thirdly, the application of sufficient heat to assure bonding by vitrification or thermal cementing of the composition. The firing range is extremely wide for this composition. Thus, a product may be produced at firing conditions ranging from temperatures of about 1600° F. to about 2300° F.; however, preferably temperatures between about 1800° F. to about 2100° F. will be used. In the preferred composition, the amount of shrinkage does not increase as the temperature is increased within this range as is the case in clay and shale products, and the chief difference existing in the preferred products of the invention produced at different temperatures lies in the compressive strength. Thus, the higher the temperature, the more extensive the vitrification and the stronger the product produced.

The product can be produced in conventional brick- and tile-making kilns whether periodic or continuous, but as stated the lack of clay and shale-like properties simplifies considerably the kiln operation and a very rapid firing cycle may be employed. The presence of the carbon is the only limitation in this respect since with fly ash compositions having an unusually high carbon content some time must be consumed in burning this out before permitting the temperature of the kiln to rise to a point where vitrification starts. In the case when there is an appreciable quantity of carbon present, as stated above, sufficient time must be allowed for removal of the major portion of the carbon prior to vitrification. For example, when a fly ash contains more than 20% carbon and a mix is made comprising 50% fly ash and 50% slag, it is desirable to subject the body to a low temperature-firing period lasting from five to six hours or more, depending upon the temperature. When a temperature of 1500° F. is used, five hours are sufficient but when a temperature of 1000° F. is used, as much as eighteen hours may be required. After the carbon has been removed, the firing cycle can be continued following the pattern typical of carbon-free material. Instead of using a continuous kiln with a relatively short time cycle, a conventional periodic kiln may be employed in which the time cycle may extend for many days or weeks, for example twenty-eight days. In an operation of this kind, there is sufficient soaking time to eliminate any carbon before vitrification and the product so produced is satisfactory in all respects. The cooling cycle may be very rapid, far more rapid than in the production of conventional ceramic products and is determined by the mechanics of operating the kiln and the economics of utilizing the waste heat.

In the product of the present invention, the fly ash provides the thermal bonding material, that is to say, the particles of fly ash are thermally merged with each other and are bound to the slag particles by interfacial fusion of the fly ash. To put it another way, the refractory particles of the composition are thermally bound in a continuous phase of a predominantly fly ash matrix which has been produced by the firing. The continuous matrix referred to is the physical condition apparent upon visual examination of the product, although an examination of the product under magnification may indicate an apparently heterogeneous structure of the matrix caused by the patterns of the various glasses and crystalline materials present. However, as the conditions and factors of the present invention are varied as set forth herein, the visual appearance of the matrix will nevertheless indicate an apparent continuous phase. Thus, it will be seen that, as distinguished from products where fly ash has been added as a diluent or filler and where the bond is due to vitrification of the clay or shale, the bond in the present product is primarily the fly ash itself. This is the case even where additive materials are present in the moldable mix due to the fact that such materials when used are present in limited amounts so that the matrix comprises at least about 80% and preferably at least about 90% of fly ash.

The development of the glasseous fly ash bond in the product of the invention is markedly different from the development of the bond in the usual clay or shale product. Fly ash, as the result of its exposure to the very high temperature during its formation in the furnace, usually consists of between about 80% to 90% glass on the carbon-free basis, the balance being substantially crystalline refractory material. The glass varies in composition and some of the glass has a lower melting point than other portions. In the vitrification process, the lower melting point glass softens first and merges with the higher melting point glasseous portion to form the matrix and the softened lower melting point glass also attacks the slag particles to provide additional bonding. If the time-temperature conditions are increased, additional glass is softened to form more liquid phase which causes a more complete merger or blending of the liquid phase with the higher melting glass providing a structurally stronger product. Furthermore, as the time-temperature conditions are increased, additional slag softens and combines at the interface with the fly ash matrix resulting in a stronger product.

During the firing cycle, little shrinkage results from the vitrification of the fly ash due to the fact that shrinkage has already taken place during the production of the fly ash in the burning of the coal. This lack of shrinkage, as pointed out, is an important characteristic of the preferred product of the present invention and is unique since the shaped forms prepared from the usual clay and shale materials shrink appreciably during the firing cycle.

In accordance with the present invention, the degree of vitrification will depend on the use for which the product is intended and may vary from the minimum binding effect (incipient vitrification) needed to obtain an integrally bonded product up through the range where the resulting product has a very low porosity and permeability due to the substantial filling of the pores by the glassy material. Oftentimes, a completely non-porous, non-permeable product is not desired, and, therefore, the vitrification will not be carried beyond the point where the product will have the desired porosity, permeability, and strength to permit its use as a brick, tile, or pipe in the structural field. In any event, the firing condition will not cause the product to become viscous and thereby lose its shape; hence, the term "vitrification" is used herein to designate the condition which exists in the product where the lower melting glasseous portion of the fly ash has been merged with the higher melting portion of the fly ash and slag particles to form an integral structure.

The following are typical examples of the products of the invention but do not limit the scope of the invention as described herein:

*Example I*

|  | Parts by weight |
|---|---|
| Fly ash | 50 |
| Slag | 50 |
| Bentonite | 1.8 |
| Water (computed on a dry basis) | 16.2 |

The fly ash used contained 11% of carbon and was obtained from an industrial power plant burning powdered bituminous coal. The screen analysis showed that 90% passed a 325-mesh screen and that a majority of the particles were sub-micron in size. The slag was treated in an impact mill and screened in closed circuit through a 10-mesh screen and had the screen analysis corresponding to that set forth previously. The bentonite and water were mixed to form a 10% bentonite slip. These materials were mixed and the resulting fly ash-slag body was dumped into a wet pan, conveyed from the wet pan over a screen to a raw storage tank, fed out of this tank into a standard pug-machine, dropped from the pug into a Chamber Extrusion De-Airing machine. The material was expressed from the De-Airing machine, cut by means of a conventional type wire into standard brick shapes, the green material was then lifted off, placed on drying cars, and placed in the driers. The driers were typical waste heat tunnels in which the temperature was 350° F., and in which the free water was eliminated. The complete drying time was 24 hours. After removal from the drier, the material was placed in a periodic down-draft kiln. The complete cycle for this, including the loading of the kiln, the heat-up period to 1900° F., and the cooling period, was four weeks. The bricks after drying but before vitrification were black in color and after the treatment in the kiln were brick-red.

The following table shows the values for a product obtained as above described, as contrasted to a conventional clay or shale product:

|  | Ceramic Body of Present Invention | Conventional Clay or Shale Product |
|---|---|---|
| Compressive Strength | 7,350 | 4,000 to 8,000 |
| Transverse Strength | 940 | 500 to 1,000 |
| Absorption per cent | 10 | 8 to 12 |
| Saturation Co-efficient do | .78 | .78 to .90 |
| Linear Shrinkage during Firing per cent | Less than 0.1 | 10 to 15 |

In addition to the above, tests of the composition of the present invention with a standard weatherometer showed no loss of weight. Fifty cycles of freezing and thawing showed no change in color, appearance, or loss in weight. Furthermore, when cut, the product of the invention showed that the bond existed between the fly ash matrix and the slag.

*Example II*

A body was prepared as set forth in Example I in which, however, the bentonite was replaced by 1% of guloc and the body was formed into bricks as described in that example. The bricks were fired both in the periodic type of kiln of Example I and in a standard tunnel kiln operating with a 58-hour cycle and reaching a maximum temperature of 2200° F. The products obtained were comparable in appearance to bricks made of conventional clay or shale bodies, and had properties corresponding to the bricks of Example I. The product obtained in the tunnel kiln operation was stronger and showed other advantages as compared to the periodic kiln operation due to the higher temperature reached during the firing cycle in the tunnel kiln.

*Example III*

A body was prepared as in Example I by mixing 25 parts of slag, 75 parts of fly ash, 1.5 parts of bentonite, and 15.5 parts of water (parts by weight). The fly ash and slag were the same as those employed in the previous examples. A Fate-Root-Heath vacuum extrusion machine was used to form the extruded ribbon. This ribbon was cut by wire-cutting means to standard brick dimensions and the green brick was placed on pallets and placed in a drying oven at a temperature of about 200° F. for 48 hours. After drying, the bricks were placed in a standard tunnel kiln with a complete firing cycle of 35 hours from the time the material entered the kiln until it was removed. The temperature reached in this operation was 1750° F. The product produced was satisfactory in all respects but was lighter in color than the bricks of the preceding examples due to the lowering of the slag content and had a slightly lower compressive strength than the product of Example I due primarily to the lower firing temperature.

*Example IV*

Example III was repeated using a weight ratio of fly ash to slag of 1 to 2, instead of the ratio given in the example, and a product of comparable properties was obtained.

In addition to the foregoing examples, ceramic products following the procedures above set forth have been prepared where the body has contained slag in amounts from a few per cent., for example, 5% to 10%, up to about 80% of the dry materials. In all instances, an excellent substitute or imitation product has been provided which is at least comparable in properties to the standard clay or shale product.

As stated previously, other additives may be incorporated in the moldable mix so long as the glasseous bond or matrix of the fired product consists of at least about 80% and preferably at least about 90% fly ash. That is to say, the mixture will contain less than about 20% of material, based on the weight of the fly ash and said material, which, upon vitrification, will be present with the fly ash in the continuous matrix of the ceramic product. Also, the product of the invention may contain in addition to the coal-ash slag, other grog such as ground fire brick, flint, or other refractory material. The usual surface effects possible with ceramic ware can also be imparted to the product of the present invention.

Considerable modification is possible in the composition of the body and ceramic product, as well as in the methods of making the ceramic body and product, without departing from the essential features of the invention.

I claim:

1. A ceramic article having a reddish coloration and possessing properties making it available for uses where clay and shale ceramic products are employed comprising, in the form of a shaped, dense, ceramic structure, refractory particles comprising coal-ash slag particles bound by interfacial fusion to and in a continuous matrix consisting of at least 80% of thermally merged fly ash, any remainder of said matrix being material fusible with said fly ash and forming therewith said continuous matrix, and said coal-ash slag being present in an amount between about 5% and about 80% based on the weight of the coal-ash slag and fly ash present in the product, substantially all of the iron in said fly ash being present in the ferric state.

2. A ceramic article having a reddish coloration and possessing properties making it available for uses where clay and shale ceramic products are employed comprising, in the form of a shaped, dense, ceramic structure, refractory particles comprising coal-ash slag particles bound by interfacial fusion to and in a continuous matrix consisting substantially entirely of thermally merged fly ash, said coal ash slag being present in an amount between about 5% and about 80% based on the weight of the coal ash slag and fly ash present in the product, substantially all of the iron in said fly ash being present in the ferric state.

3. A ceramic article having a reddish coloration and possessing properties making it available for uses where clay and shale ceramic products are employed, and being characterized by a linear shrinkage of less than about 1% which comprises, in the form of a shaped, dense, ceramic structure, refractory particles comprising coal-ash slag particles bound by interfacial fusion to and in a continuous matrix consisting essentially of thermally merged fly ash, said coal ash slag being present in an amount between about 5% and about 80% based on the weight of the coal ash slag and fly ash present in the product, substantially all of the iron in said fly ash being present in the ferric state.

4. The ceramic article of claim 3 wherein the coal-ash slag particles are present in an amount between about 35% and about 65% based on the weight of the coal-ash slag and fly ash present in the product.

5. The ceramic article of claim 3 wherein the coal-ash slag particles are present in an amount between about 45% and about 55% based on the weight of the coal-ash slag and fly ash present in the product.

6. The process of making a shaped ceramic product of reddish coloration and having properties making it available for uses where clay and shale ceramic products are employed, which comprises preparing a moldable body comprising fly ash, coal-ash slag particles, and water, said mixture containing less than 20% of material, based on the weight of the fly ash and said material, which is fusible with the fly ash forming therewith a continuous matrix in the ceramic product, and said mixture containing between about 5% and about 80% of coal-ash slag particles based on the combined weight of the coal-ash slag and fly ash, forming said moldable mixture into a ceramic shape, and subjecting said shaped product to a firing cycle, the heat being supplied from an external source, to vitrefy said shaped product to form a shaped ceramic product in which refractory particles comprising the coal-ash slag particles are bound by interfacial fusion in a continuous matrix, comprising thermally merged fly ash, substantially all of the iron in said fly ash being present in the ferric state, said firing cycle being controlled such that the removal of any carbon and any oxidation of iron in the fly ash in said shaped product is substantially accomplished before said vitrefication.

7. The process of claim 6 wherein the moldable body consists essentially of coal-ash slag, fly ash, and water.

8. The process of claim 6 wherein bentonite is present in said moldable body in an amount between .1% and 2% by weight of the dry materials.

9. The process of making a shaped ceramic product of reddish coloration and having properties making it available for uses where clay and shale ceramic products are employed, which comprises preparing a moldable body comprising fly ash, coal-ash slag particles and water, said mixture containing less than 20% of material based on the weight of the fly ash and said material, which is fusible with the fly ash forming therewith a continuous matrix in the ceramic product, and said coal-ash slag particles being present in an amount between about 5% and about 80% based on the combined weight of the coal-ash slag and fly ash, forming said moldable mixture into a ceramic shape, and subjecting said shaped product to a firing cycle, the heat being supplied from an external source, to remove carbon, to oxidize substantially all of the iron in the fly ash to the ferric state and to vitrify said product to form a ceramic product in which refractory particles are bound in a matrix; said firing cycle being controlled to remove substantially all of the carbon and to oxidize substantially all of the iron in the fly ash prior to vitrification of said product.

10. The process of claim 9 wherein the fly ash has a carbon content of from 2% to 25%; and wherein the carbon is removed from the shaped product at a temperature above about 1000° F. and below the vitrification temperature of the product.

11. The process of claim 9 wherein the moldable body consists essentially of coal-ash slag, fly ash, and water.

12. The process of claim 9 wherein bentonite is present in said moldable body in an amount between .1% and 2% by weight of the dry materials.

CHARLES RAYMOND BROWN.

REFERENCES CITED

The following references are of record in the file of this patent:

UNITED STATES PATENTS

| Number | Name | Date |
|---|---|---|
| 2,055,706 | Ramseyer | Sept. 29, 1936 |
| 2,414,734 | Gelbman | Jan. 21, 1947 |